United States Patent
Adachi et al.

(10) Patent No.: US 9,797,272 B2
(45) Date of Patent: Oct. 24, 2017

(54) THERMAL ENERGY RECOVERY DEVICE AND CONTROL METHOD

(71) Applicant: Kobe Steel, Ltd., Kobe-shi (JP)

(72) Inventors: Shigeto Adachi, Takasago (JP); Takayuki Fukuda, Takasago (JP); Koichiro Hashimoto, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 274 days.

(21) Appl. No.: 14/672,768

(22) Filed: Mar. 30, 2015

(65) Prior Publication Data
US 2015/0330256 A1 Nov. 19, 2015

(30) Foreign Application Priority Data
May 15, 2014 (JP) ................................ 2014-101580

(51) Int. Cl.
*F01K 13/02* (2006.01)
*F01K 7/16* (2006.01)
(Continued)

(52) U.S. Cl.
CPC ................ *F01K 7/16* (2013.01); *F01K 13/02* (2013.01); *F03G 7/04* (2013.01); *F01K 25/08* (2013.01);
(Continued)

(58) Field of Classification Search
CPC . F01K 3/22; F01K 9/003; F01K 13/02; F04C 2270/185; F04C 2270/195
See application file for complete search history.

(56) References Cited

U.S. PATENT DOCUMENTS

| | | | | |
|---|---|---|---|---|
| 2004/0255587 | A1* | 12/2004 | Radcliff | F01K 23/065 60/671 |
| 2010/0229553 | A1* | 9/2010 | Smith | F01K 9/003 60/690 |

(Continued)

FOREIGN PATENT DOCUMENTS

| | | |
|---|---|---|
| CN | 102817649 A | 12/2012 |
| EP | 2 578 817 A2 | 4/2013 |

(Continued)

OTHER PUBLICATIONS

Extended European Search Report issued May 27, 2015 in Patent Application No. 15159190.6.

*Primary Examiner* — Jonathan Matthias
(74) *Attorney, Agent, or Firm* — Oblon, McClelland, Maier & Neustadt, L.L.P.

(57) ABSTRACT

A thermal energy recovery device includes: a circulating flow path connected to a heater, an expander, a condenser and a circulating pump for circulating a working medium; a bypass valve in a bypass path connecting the upstream side region and the downstream side region of the expander in the circulating flow path; a power recovery machine connected to the expander; a circulating pump sending the working medium condensed in the condenser to the heater; a cooling medium pump sending a cooling medium to the condenser; an upstream side sensor detecting the pressure/temperature of the working medium on the expander upstream side in the circulating flow path; and a controller controlling the bypass valve and the cooling medium pump. The controller opens the bypass valve after stopping the circulating pump, and drives the cooling medium pump if the pressure/temperature of the working medium on the expander upstream side exceeds a threshold.

6 Claims, 4 Drawing Sheets

(51) Int. Cl.
*F03G 7/04* (2006.01)
*F01K 25/08* (2006.01)
(52) U.S. Cl.
CPC .... *F04C 2270/185* (2013.01); *F04C 2270/80* (2013.01)

(56) References Cited

U.S. PATENT DOCUMENTS

| | | |
|---|---|---|
| 2012/0261112 A1 | 10/2012 | Lourenco et al. |
| 2012/0261119 A1 | 10/2012 | Lourenco et al. |
| 2012/0261121 A1 | 10/2012 | Lourenco et al. |
| 2012/0261122 A1 | 10/2012 | Lourenco et al. |
| 2012/0261123 A1 | 10/2012 | Lourenco et al. |
| 2012/0261141 A1 | 10/2012 | Lourenco et al. |
| 2012/0261142 A1 | 10/2012 | Lourenco et al. |
| 2012/0312021 A1 | 12/2012 | Tsuboi et al. |
| 2013/0084164 A1 | 4/2013 | Adachi et al. |
| 2013/0255254 A1 | 10/2013 | Ehrsam et al. |

FOREIGN PATENT DOCUMENTS

| | | |
|---|---|---|
| EP | 2 647 841 A1 | 10/2013 |
| JP | 56-32017 A | 4/1981 |
| JP | 57-24405 A | 2/1982 |
| JP | 11-107906 | 4/1999 |
| JP | 2007-6683 A | 1/2007 |
| JP | 2008-8217 A | 1/2008 |
| JP | 2012-255400 A | 12/2012 |
| JP | 2013-181456 A | 9/2013 |

\* cited by examiner

THERMAL ENERGY RECOVERY DEVICE AND CONTROL METHOD

BACKGROUND OF THE INVENTION

Field of the Invention

The present invention relates to a thermal energy recovery device for recovering exhaust heat.

Description of the Related Art

Conventionally, thermal energy recovery devices for recovering thermal energy such as geothermal water are known, and a representative thereof is a binary generator.

Japanese Patent Application Laid-Open No. H11-107906 discloses an example of a binary power generation system. The binary power generation system has a closed loop which sequentially connects an evaporator, a screw turbine and a condenser and circulates a working medium. In a bypass path which connects the upstream side and the downstream side of the screw turbine in the closed loop, a pressure regulating valve is provided. The pressure regulating valve opens when a detection value of a pressure sensor provided on the upstream side of the screw turbine in the closed loop exceeds a set value. Between the evaporator and the condenser in the closed loop, an automatic valve is provided. The automatic valve ordinarily opens, and is set so as to automatically close when the power is turned off in case of some sort of trouble. When the automatic valve closes at the time of the power-off, the working medium is not supplied to the evaporator, so that, even if a heat source fluid is supplied to the evaporator, evaporation of the working medium in the evaporator does not continue, and operation of a safety valve provided in the closed loop due to an abnormal pressure rise is suppressed.

SUMMARY OF THE INVENTION

However, in the above prior art, a cooling water pump which supplies cooling water to the condenser remains stopped in a state that the power is turned off, so that forced cooling of the working medium by means of the cooling water is not performed. Therefore, even if the pressure regulating valve opens when the detection value of the pressure sensor exceeds the set value, an efficiency of reducing pressure in the closed loop is not sufficient, and operation of the safety valve cannot always be prevented.

An object of the present invention is to provide a thermal energy recovery device capable of suppressing an excessive rise of pressure in a circulating flow path of the working medium after stopping a circulating pump.

As a means for solving the above problem, the present invention is a thermal energy recovery device including: a heater which heats a working medium by exchanging heat between a heat medium and the working medium; an expander into which the working medium flowed out from the heater flows; a power recovery machine connected to the expander; a condenser which condenses the working medium flowed into from the expander by heat exchange with a cooling medium; a circulating pump which sends the working medium condensed in the condenser to the heater; a circulating flow path which connects the heater, the expander, the condenser and the circulating pump and through which the working medium circulates; a bypass path which connects the region on the upstream side than the expander, in the circulating flow path, and the region on the downstream side than the expander; a bypass valve provided in the bypass path; a cooling medium pump which sends the cooling medium to the condenser; and a controller, in which the controller executes a communication control that is a control for communicating the heater and the condenser via the bypass path by opening the bypass valve, in order to condense the working medium evaporated in the heater, when the stoppage of the circulating pump is detected.

In the thermal energy recovery device, after stopping the circulating pump, the working medium evaporated in the heater can be sent speedily to the condenser, so that an excessive rise of pressure in the circulating flow path by the working medium heated in the heater is prevented.

In the present invention, the thermal energy recovery device includes the cooling medium pump which sends the cooling medium to the condenser, and the controller preferably executes a supply control that is a control for supplying the cooling medium to the condenser by driving the cooling medium pump, in order to condense the working medium evaporated in the heater, when the stoppage of the circulating pump is detected.

In such a manner, the flow volume of the cooling medium can be easily controlled.

Moreover, in the present invention, preferably, the thermal energy recovery device further includes a sensor which is arranged in a pathway in the circulating flow path from the heater to the condenser and detects the pressure or temperature of the working medium, and the controller executes only the communication control ahead, and executes the supply control if a detection value of the sensor exceeds a threshold value.

In such a manner, the cooling medium is prevented from being sent unnecessarily.

Moreover, in the present invention, preferably, the thermal energy recovery device further includes a sensor which is arranged in a region between the heater and the expander in the circulating flow path and detects the pressure or temperature of the working medium, and the controller executes the communication control and the supply control if a detection value of the sensor exceeds a threshold value.

In such a manner, the cooling medium is prevented from being sent unnecessarily.

Moreover, in the present invention, preferably, the thermal energy recovery device further includes a shut-off valve which shuts off the working medium flowing into the expander, and the controller closes the shut-off valve in time with the stoppage of the circulating pump.

In such a manner, the whole volume of the evaporated working medium can be sent to the condenser via the bypass path, and the pressure can be reduced more speedily.

Moreover, the present invention is a pressure control method at the time of stoppage of a thermal energy recovery device provided with a circulating flow path which circulates a working medium between a heater, an expander, a condenser and a circulating pump, and a power recovery machine connected to the expander, including a stopping step of stopping the circulating pump, a communicating step of communicating the heater and the condenser after the stopping step, and a supplying step which is a control for supplying a cooling medium to the condenser after the stopping step.

In the control method, after stopping the circulating pump, an excessive rise of pressure in the circulating flow path by the working medium heated in the heater is prevented.

As described above, according to the present invention, the thermal energy recovery device capable of suppressing an excessive rise of pressure of the working medium in the circulating flow path after stopping the circulating pump can be provided.

DESCRIPTION OF THE PREFERRED EMBODIMENTS

Hereinafter, preferred embodiments of the present invention will be described in detail with reference to the accompanying drawings.

First Embodiment

Figure 1:
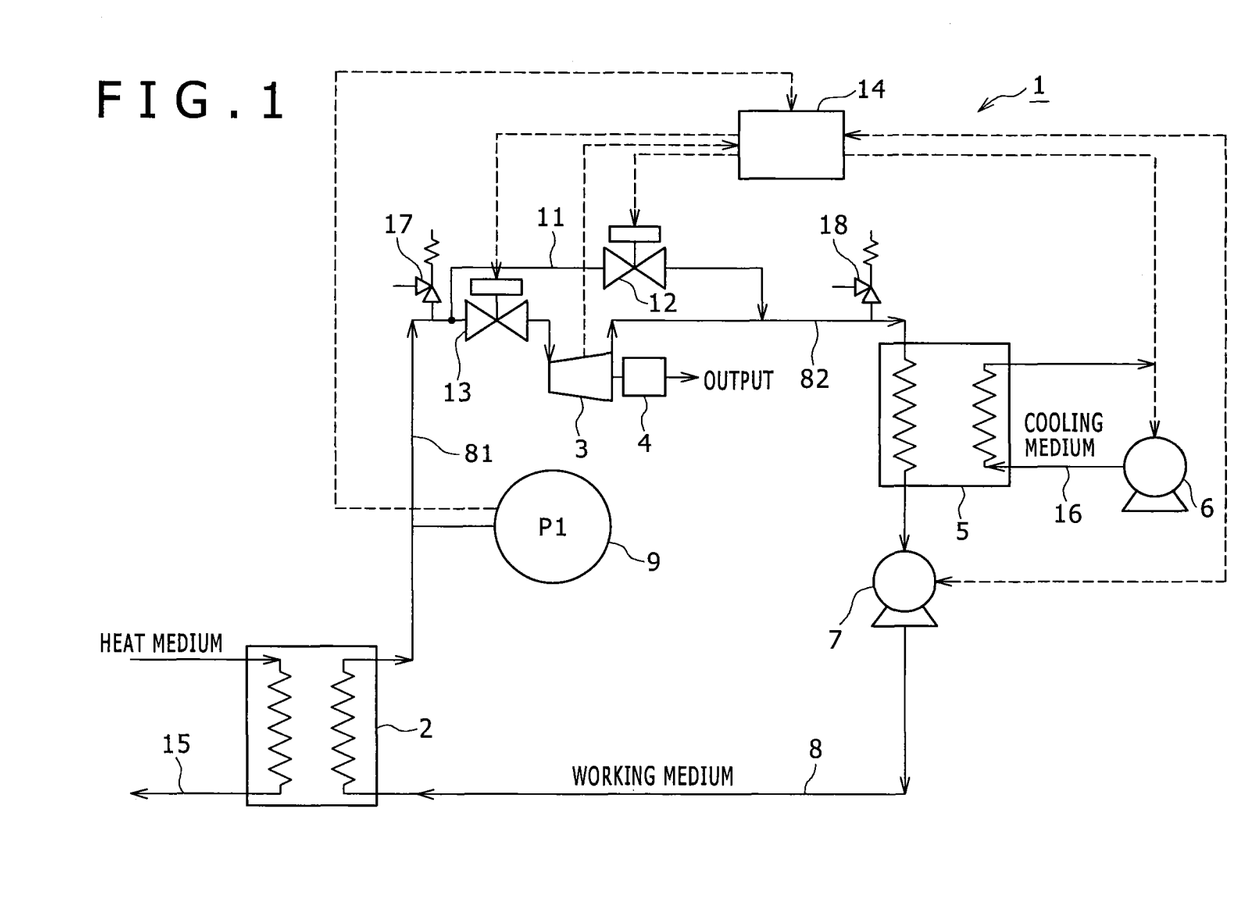
FIG. 1 is a block diagram showing a configuration of a thermal energy recovery device according to a first embodiment of the present invention.

FIG. 1 is a block diagram showing a configuration of a thermal energy recovery device 1 according to a first embodiment of the present invention. In FIG. 1, solid arrows show flows of various media, and dashed arrows show flows of electric signals. The thermal energy recovery device 1 includes a heater 2, an expander 3, a condenser 5, a circulating pump 7, a generator 4 which is a power recovery machine, a cooling medium pump 6, a circulating flow path 8, and a controller 14. The thermal energy recovery device 1 further includes a shut-off valve 13, an upstream side sensor 9, an upstream side safety valve 17, and a downstream side safety valve 18. The generator 4 is connected to the expander 3. The heater 2, the expander 3, the condenser 5 and the circulating pump 7 are connected to the circulating flow path 8 in this order, and a working medium circulates between these members. For example, as the working medium, low boiling point organic media (Freon or the like) such as R245fa whose boiling point is lower than that of water can be used. In the following description, of the circulating flow path 8, the region between the heater 2 and the expander 3, which is the region on the upstream side of the expander 3, is referred to as "an upstream path 81". Of the circulating flow path 8, the region between the expander 3 and the condenser 5, which is the region on the downstream side of the expander 3, is referred to as "a downstream path 82". The circulating flow path 8 includes a bypass path 11 which bypasses the expander 3, and a bypass valve 12 provided on the bypass path 11. The controller 14 performs an open/close control of the shut-off valve 13 and the bypass valve 12 and a drive control of the circulating pump 7 and the cooling medium pump 6.

The heater 2 has a flow path through which the working medium flows and a flow path through which a heat medium flows, exchanges heat between the working medium and the heat medium, and heats and evaporates the working medium in liquid phase. In the gravity direction, the heater 2 is located below the condenser 5. For example, exhaust heat from an internal combustion engine, of ships or the like, or compressed air discharged from a supercharger, and the like are used as the heat medium. Moreover, the heat medium may include high temperature compressed gas discharged from a compressor, and the like, but it is not limited specifically. In the thermal energy recovery device 1, the heat medium flows into the heater 2 constantly or intermittently regardless of whether it is being driven or stopped.

The expander 3 is a screw expander and is arranged on the downstream side of the heater 2 in the circulating flow path 8. The working medium in gas phase flowed out from the heater 2 flows into the expander 3. As the expander, a scroll-type or a turbo-type may be used. In the expander 3, a rotor within the expander 3 rotates by expanding the working medium. Thereby, the generator 4 connected to the expander 3 generates power.

The condenser 5 has a flow path through which a cooling medium flows and a flow path through which the working medium flows, exchanges heat between the cooling medium and the working medium flowed into from the expander 3, and cools and condenses the working medium. In addition, a reservoir for storing the working medium in liquid phase may be provided between the condenser 5 and the circulating pump 7 in the circulating flow path 8. The cooling medium is sent to the condenser 5 by the cooling medium pump 6 provided in a cooling medium flow path 16, and deprives heat from the working medium in the condenser 5. For example, the cooling medium pump 6 is a centrifugal pump including an impeller as a rotor, a gear pump having a rotor consisting of a pair of gears, or the like.

The circulating pump 7 is provided between the condenser 5 and the heater 2 in the circulating flow path 8, and sends the working medium condensed in the condenser 5 to the heater 2. For example, a centrifugal pump or a gear pump is used as the circulating pump 7. The circulating pump 7 sends the information about whether it is operated or stopped, to the controller 14. Here, the stoppage of the circulating pump 7 includes not only the stoppage of a pressurizing part of the circulating pump 7 but also the state that a stop control is performed to a driving part for driving the pressurizing part and the pressurizing part does not substantially pressurize the working medium.

Both ends of the bypass path 11 are connected to the upstream side path 81 which is the region on the upstream side of the expander 3 and the downstream side path 82 which is the region on the downstream side thereof. By providing the bypass path 11, the working medium flowed out from the heater 2 can bypass the expander 3 and flow into the condenser 5. The bypass valve 12 is provided in the bypass path 11. The bypass valve 12 may be an opening and closing valve only capable of opening and closing, or may be a flow control valve capable of adjusting opening.

The shut-off valve 13 is located on the expander 3 side than the position to which the end of the bypass path 11 is connected, of the upstream side path 81. By closing the shut-off valve 13, the working medium flowing into the expander 3 from the heater 2 is shut off. The shut-off valve 13 can control opening and closing thereof by the controller 14 described later.

The upstream side sensor 9 is a pressure sensor, and is located between the heater 2 and the shut-off valve 13 and detects a pressure P1 of the working medium in the upstream side path 81. The upstream side sensor 9 sends a signal corresponding to a detection value, to the controller 14.

The upstream side safety valve 17 is located between the heater 2 and the shut-off valve 13. The upstream side safety valve 17 is opened when the pressure P1 of the working medium in the upstream side path 81 exceeds an upper limit th1. The upper limit th1 is a design pressure (or an allowable pressure) of the upstream side path 81. By opening the upstream side safety valve 17, the working medium is escaped to the outside, thereby preventing an abnormal increase in the pressure of the upstream side path 81.

The downstream side safety valve 18 is located in the downstream side path 82, and is opened when a pressure P2 of the working medium in gas phase in the downstream side path 82 exceeds an upper limit th3. By opening the downstream side safety valve 18, the working medium is escaped to the outside, thereby preventing an excessive rise of the pressure of the downstream side path 82. The upper limit th3 is a design pressure (or an allowable pressure) of the downstream side path 82, and is set to a value lower than the upper limit th1.

Next, a pressure control operation of the controller 14 after stopping the thermal energy recovery device 1, that is, after stopping the circulating pump 7, will be described with reference to FIG. 2. When the thermal energy recovery device 1 is stopped, the circulating pump 7 is stopped. Further, the shut-off valve 13 is closed in time with the stoppage of the circulating pump 7, and the expander 3 is stopped. Between the heater 2 and the circulating pump 7, the working medium in liquid phase which is not evaporated in the heater 2 remains. Moreover, as mentioned previously, since the heater 2 is located below the condenser 5 in the gravity direction, the working medium in liquid phase may leak between the heater 2 and the circulating pump 7 through gaps between members of the circulating pump 7 from the condenser 5 (or the reservoir (not shown)).

When the circulating pump is stopped, firstly, the bypass valve 12 is opened (Step S21). The heater 2 and the condenser 5 are communicated via the bypass path 11. If the heat medium flows into the heater 2, the working medium in liquid phase existing between the heater 2 and the circulating pump 7 is heated and evaporated, and the pressures of the upstream side path 81 and the downstream side path 82 rise. In the controller 14, whether the pressure P1 of the working medium detected by the upstream side sensor 9 is more than a threshold value th2 or not is determined (Step S22). The threshold value th2 is set lower than the upper limit th1 set to the upstream side safety valve 17 and the upper limit th3 set to the downstream side safety valve 18. If it is determined that the pressure P1 is more than the threshold value th2 (the determination is YES), the cooling medium pump 6 is driven by an instruction of the controller 14 (Step S23), and the cooling medium is supplied to the condenser 5. The working medium evaporated in the heater 2 is cooled forcibly and condensed in the condenser 5. As a result, a rise of the pressure of the working medium in the upstream side path 81 and the downstream side path 82 is prevented. Since the threshold value th2 is smaller than the above-mentioned upper limits th1 and th3, the upstream side safety valve 17 and the downstream side safety valve 18 are prevented from being opened.

After the elapse of a predetermined time, if the pressure P1 is detected again and the pressure P1 is less than the threshold value th2 (Step S22), driving of the cooling medium pump 6 is stopped (Step S24). Further, after the elapse of a predetermined time, the pressure P1 is detected again and compared to the threshold value th2 (Step S22). If the pressure P1 exceeds the threshold value th2 again, driving of the cooling medium pump 6 is restarted (Step S23), and the working medium is cooled in the condenser 5. In this way, when the thermal energy recovery device 1 is stopped, a rise of the pressures of the upstream side path 81 and the downstream side path 82 is prevented by repeatedly detecting the pressure P1. In addition, detection of the pressure P1 may be performed continuously. The same applies to the following other embodiments.

As described above, in the thermal energy recovery device 1 according to the present embodiment, a control (hereinafter, referred to as "a communication control".) for communicating the heater 2 and the condenser 5 after stopping the circulating pump 7 and a control (hereinafter, referred to as "a supply control".) for supplying the cooling medium to the condenser 5 are performed. Thereby, the working medium evaporated in the heater 2 is cooled forcibly and condensed, and an excessive rise of the pressures in the upstream side path 81 and the downstream side path 82, that is, the pressures on the upstream side and the downstream side of the expander 3 is prevented. As a result, operation (opening) of the upstream side safety valve 17 and the downstream side safety valve 18 are prevented.

In the thermal energy recovery device 1, after stopping the circulating pump 7, the communication control is performed in advance, and the supply control of the cooling medium is performed if the detection value of the upstream side sensor 9 exceeds the threshold value, so that unnecessary driving of the cooling medium pump 6 is prevented, and power consumption is reduced. By providing the bypass path 11, the working medium evaporated in the heater 2 can be sent to the condenser 5 speedily. The whole volume of the working medium flows through the bypass valve 12 by closing the shut-off valve 13, thereby capable of sending the working medium to the condenser 5 more speedily. Since the supply control of the cooling medium is performed based on driving of the cooling medium pump 6, the flow volume of the cooling medium can be easily controlled.

(Modified Example of First Embodiment)

Figure 3:
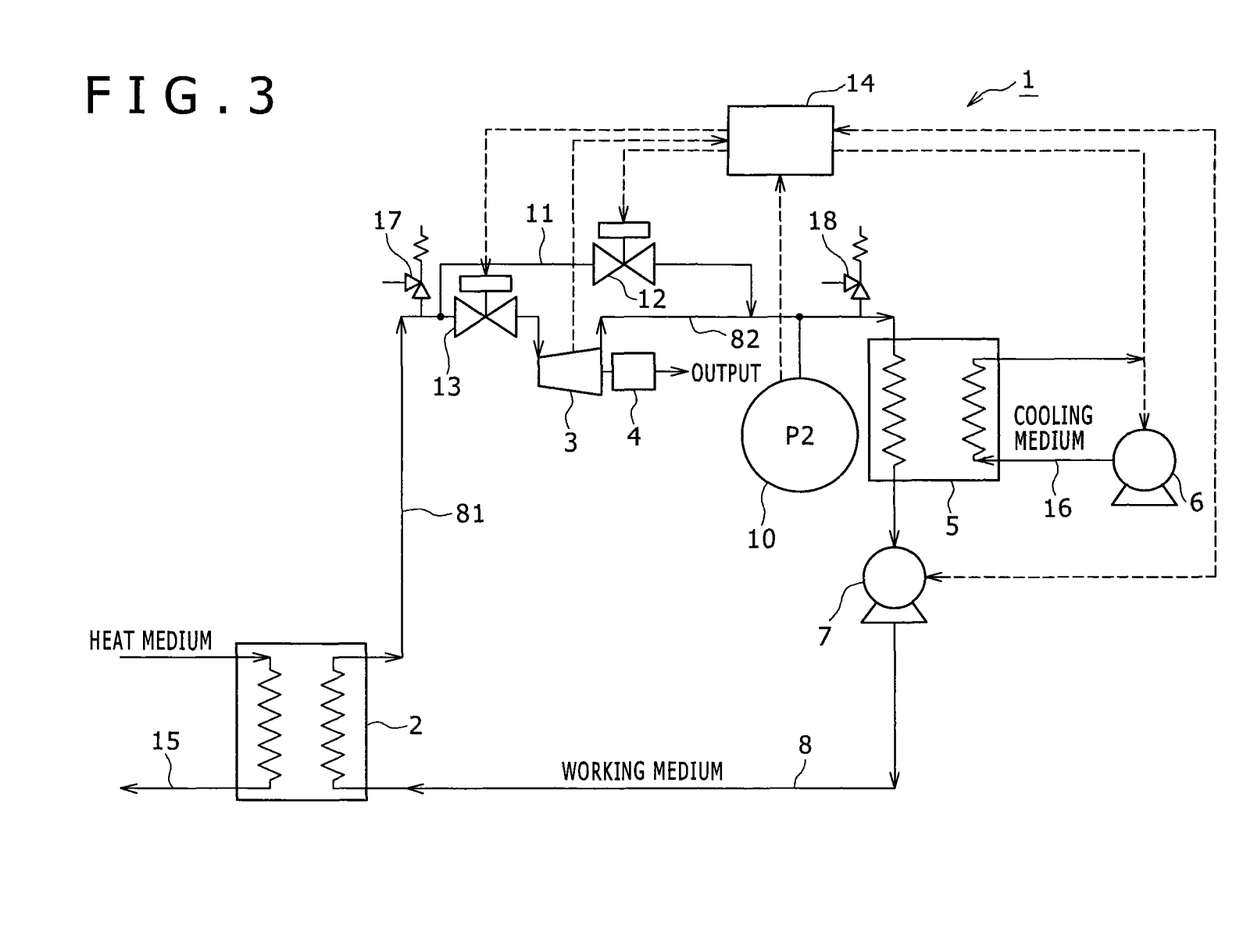
FIG. 3 is a block diagram showing a configuration of a thermal energy recovery device according to a second embodiment of the present invention.

FIG. 3 is a block diagram showing a configuration of a thermal energy recovery device according to another example of the first embodiment. In addition, the same reference numerals as those of the first embodiment will be given to the same components, and the detail description thereof will be omitted. In the circulating flow path 8 of the thermal energy recovery device 1, a downstream side sensor 10 located in the downstream flow path 82 is provided in place of the upstream side sensor 9. The downstream side sensor 10 detects the pressure P2 of the working medium in gas phase in the downstream flow path 82. The downstream side sensor 10 sends a signal corresponding to the detection value, to the controller 14.

Figure 2:
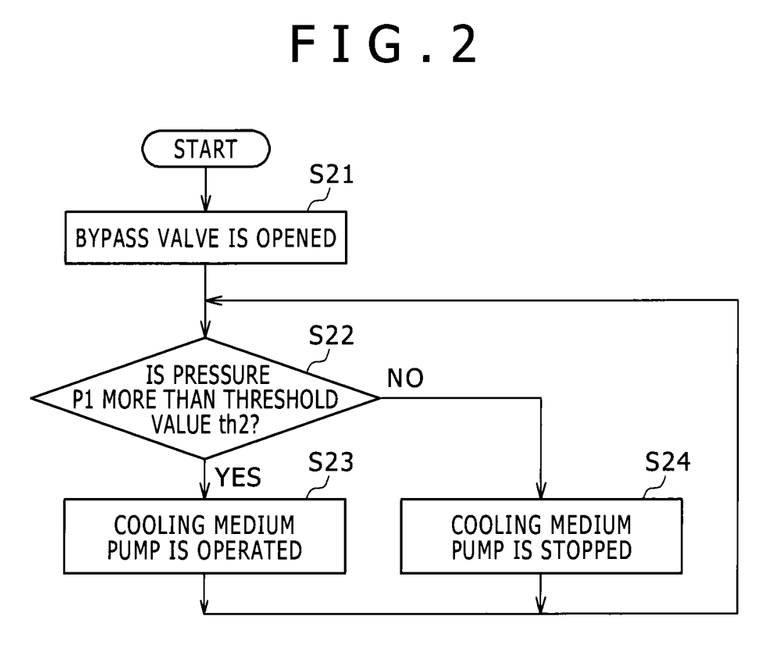
FIG. 2 is a flow chart showing an operation of a controller of the thermal energy recovery device.

The operation of the controller 14 after stopping the circulating pump 7 is almost the same as FIG. 2, and firstly, the bypass valve 12 is opened (Step S21). Whether the pressure P2 of the working medium detected by the downstream side sensor 10 is more than the threshold value th2 or not is determined (Step S22), and if it is determined that the pressure P2 is more than the threshold value th2 (the determination is YES), the cooling medium pump 6 is driven by an instruction of the controller 14 (Step S23). The working medium flowed out from the heater 2 is cooled forcibly and condensed in the condenser 5. After the elapse of a predetermined time, if the pressure P2 is detected again and the pressure P2 is less than the threshold value th2 (Step S22), driving of the cooling medium pump 6 is stopped (Step S24). Further, after the elapse of a predetermined time, the pressure P2 is detected again and compared to the threshold value th2 (Step S22), and if the pressure P2 exceeds the threshold value th2, driving of the cooling medium pump 6 is restarted (Step S23), and the working medium is cooled in the condenser 5.

In the thermal energy recovery device 1, an excessive rise of the pressures in the upstream side path 81 and the downstream side path 82 is prevented, and opening of the upstream side safety valve 17 and the downstream side safety valve 18 is prevented.

Second Embodiment

Figure 4:
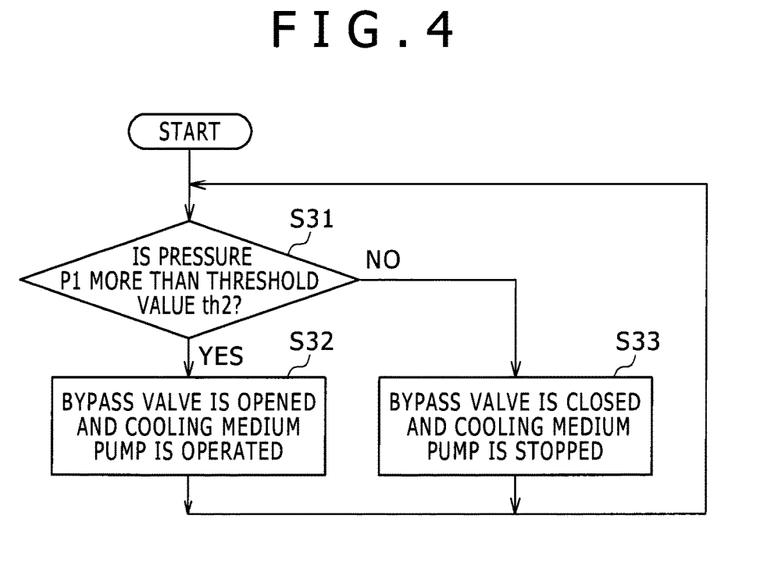
FIG. 4 is a flow chart showing an operation of a controller of the thermal energy recovery device.

Next, another operation example of the controller 14 at the time of stoppage of the thermal energy recovery device 1 will be described as a second embodiment. FIG. 4 is a flow chart showing a pressure control operation of the controller 14. The configuration of the thermal energy recovery device 1 is similar to FIG. 1. When the circulating pump 7 is stopped, the pressure P1 of the working medium is detected by the upstream side sensor 9 located in the upstream flow path 81, in a state that the shut-off valve 13 and the bypass valve 12 are closed. Whether the pressure P1 is more than the threshold value th2 or not is determined (step S31). If the pressure P1 is less than the threshold value th2 (the determination is NO), the pressure P1 is detected again after the elapse of a predetermined time. If it is determined that the pressure P1 is more than the threshold value th2 (the determination is YES), the controller 14 performs a communication control for communicating the heater 2 and the condenser 5 by opening the bypass valve 12. The cooling medium pump 6 is driven in time with the communication control (Step S32), and a supply control for supplying the cooling medium to the condenser 5 is performed. Thereby, the working medium evaporated in the heater 2 is cooled forcibly and condensed in the condenser 5. In addition, as long as the working medium can be condensed in the condenser 5, the communication control and the supply control do not always have to be simultaneously performed.

Then, after the elapse of a predetermined time, if the pressure P1 is detected again and the pressure P1 is less than the threshold value th2 (Step S31), the bypass valve 12 is closed and driving of the cooling medium pump 6 is stopped (Step S33). Further, after the elapse of a predetermined time, if the detected pressure P1 exceeds the threshold value th2 again (Step S31), the bypass valve 12 is opened and the cooling medium pump 6 is driven (Step S32), and the working medium is cooled in the condenser 5.

In the second embodiment, after stopping the circulating pump 7, if the pressure of the working medium in the upstream flow path 81 exceeds the threshold value, the communication control and the supply control of the cooling medium are performed. Thereby, an excessive rise of the pressure in the upstream flow path 81 is prevented, and operation of the upstream side safety valve 17 is prevented. Since the supply control is performed if the detection value of the upstream side sensor 9 exceeds the threshold value, unnecessary driving of the cooling medium pump 6 is prevented.

Other Embodiments

Hereinbefore, although the embodiments of the present invention are described, the present invention is not limited to the above embodiments, and various modifications are possible.

In the first embodiment, the cooling medium pump 6 does not always have to be driven if the detection value of the upstream side sensor 9 (or the downstream side sensor 10) exceeds the threshold value. By continuing driving of the cooling medium pump 6 even after stopping the circulating pump 7, in other words, by performing the supply control of the cooling medium before stopping the circulating pump 7, the evaporated working medium may be condensed. The same applies to the second embodiment.

In the second embodiment, after stopping the circulating pump 7, by opening the bypass valve 12 and the shut-off valve 13, the working medium evaporated in the heater 2 may be sent to the condenser 5 from both the bypass path 11 and a pathway from the upstream flow path 81 to the downstream flow path 82 via the expander 3. If a slight pressure difference is generated between the upstream and the downstream of the expander 3, a part of the working medium can flow into the condenser 5 via the expander 3. In addition, the shut-off valve 13 may be maintained in an opened state before and after stopping the circulating pump 7, in other words, the communication control may be performed before stopping the circulating pump 7. Also in the first embodiment, if the detection value of the upstream side sensor 9 exceeds the threshold value after stopping the circulating pump 7, the bypass valve 12 and the shut-off valve 13 are opened and the evaporated working medium may be sent to the condenser 5.

In the above embodiments, as the communication control of the controller 14, the whole volume of the working medium may be sent to the condenser 5 via the expander 3 by closing the bypass valve 12 and opening the shut-off valve 13.

In the above first embodiment, a pressure sensor may be provided in the bypass path 11. In this way, the pressure sensor may be provided in an arbitrary position wherever in a pathway in the circulating flow path 8 from the heater 2 to the condenser 5. Moreover, a correspondence relation exists between the temperature and the pressure of the working medium in gas phase, and therefore a temperature sensor may be provided in place of the pressure sensor. The communication control and the supply control are performed if the temperature of the working medium in gas phase detected by the temperature sensor exceeds a predetermined threshold value, thereby preventing an excessive rise of the pressure of the working medium in gas phase in the circulating flow path 8. The same applies to the second embodiment.

In the thermal energy recovery device 1, the heater may consist of a plurality of heat exchangers.

What is claimed is:
1. A thermal energy recovery device comprising:
   a heater which heats a working medium by exchanging heat between a heat medium and the working medium;
   an expander into which the working medium flowed out from the heater flows;
   a power recovery machine connected to the expander;
   a condenser which condenses the working medium flowed into from the expander by heat exchange with a cooling medium;
   a circulating pump which sends the working medium condensed in the condenser to the heater;
   a circulating flow path which connects the heater, the expander, the condenser and the circulating pump and through which the working medium circulates;
   a bypass path which connects the region on the upstream side of the expander, in the circulating flow path, and the region on the downstream side of the expander;
   a bypass valve provided in the bypass path;
   a cooling medium pump which sends the cooling medium to the condenser;
   a cooling medium flow path which connects the cooling medium pump and the condenser and through which the cooling medium circulates; and
   a controller,
   wherein, when a stoppage of the circulating pump is detected, the controller executes a communication control that is a control for communicating the heater and the condenser via the bypass path by opening the bypass valve, and executes a supply control that is a control for supplying the cooling medium to the condenser by driving the cooling medium pump in the cooling medium flow path in order to condense the working medium evaporated in the heater.

2. The thermal energy recovery device according to claim 1, further comprising:
  a sensor which is arranged in a pathway in the circulating flow path from the heater to the condenser and detects the pressure or temperature of the working medium,
  wherein the controller executes the communication control ahead, and executes the supply control if a detection value of the sensor exceeds a threshold value.

3. The thermal energy recovery device according to claim 1, further comprising:
  a sensor which is arranged in a region between the heater and the expander in the circulating flow path and detects the pressure or temperature of the working medium,
  wherein the controller executes the communication control and the supply control if a detection value of the sensor exceeds a threshold value.

4. The thermal energy recovery device according to claim 1, further comprising:
  a shut-off valve which shuts off the working medium flowing into the expander,
  wherein the controller closes the shut-off valve in time with the stoppage of the circulating pump.

5. A pressure control method at the time of stoppage of a thermal energy recovery device provided with a circulating flow path which circulates a working medium between a heater, an expander, a condenser, a circulating pump, and a power recovery machine connected to the expander, comprising:
  a stopping step of stopping the circulating pump;
  a communicating step of communicating the heater and the condenser via a bypass path by opening a bypass valve after the stopping step; and
  a supplying step which is a control for supplying a cooling medium to the condenser by driving a cooling medium pump in a cooling medium flow path after the stopping step.

6. The control method of the thermal energy recovery device according to claim 5, further comprising:
  a detecting step of detecting the pressure or temperature of the working medium on the upstream side of the expander in the circulating flow path after the stopping step; and
  a cooling step of sending the cooling medium to the condenser by operating the cooling medium pump if the pressure or temperature detected in the detecting step exceeds a threshold value.

* * * * *